Dec. 22, 1970     R. A. M. TOESCA     3,548,565
LUBRICATION SYSTEM FOR HIGH TEMPERATURE ENGINE
Filed Dec. 11, 1967
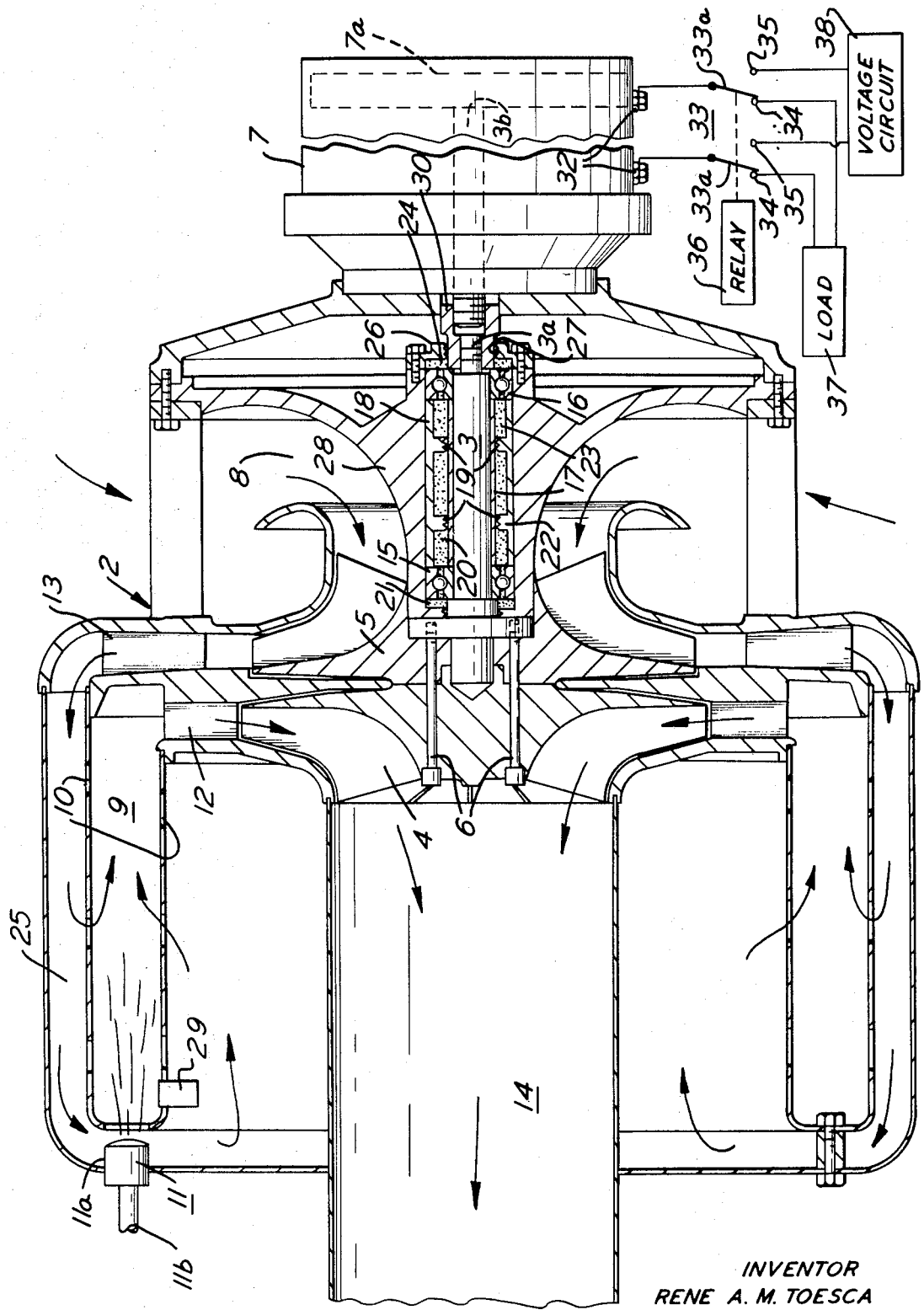
INVENTOR
RENE A. M. TOESCA
BY
Maleson, Kimmelman & Ratner
ATTORNEYS.

United States Patent Office 3,548,565
Patented Dec. 22, 1970

3,548,565
LUBRICATION SYSTEM FOR HIGH TEMPERATURE ENGINE
Rene A. M. Toesca, Boyertown, Pa., assignor to Energy Transformation Corporation, a corporation of Delaware
Filed Dec. 11, 1967, Ser. No. 695,545
Int. Cl. F02c 7/06
U.S. Cl. 60—39.02       5 Claims

ABSTRACT OF THE DISCLOSURE

A gas turbine generator is operated with grease as lubrication for the bearings of its rotor shaft. After the turbine is turned off, i.e., when combustion ceases, the generator is used as a motor to rotate the shaft at a lower speed for at least the time required for the grease, which has been rendered less viscous by the high heat of combustion to congeal and form a coating on the bearings and the races. This coating protects the parts from rust and corrosion and provides lubrication for quick restarting of the turbine.

BACKGROUND OF THE INVENTION

(A) Field of the invention

This invention relates to a system for lubricating a high temperature engine and in particular to a system for insuring long-lasting lubrication of the bearings of a gas turbine generator used for stand-by purposes.

(B) Prior art

There is a need for stand-by electrical generators, especially by utility companies such as telephone companies, to enable power to be supplied to electrically powered apparatus at various points on the telephone network in the event of failure of power from usual sources. Often, such stand-by electrical generators are positioned at remote or relatively inaccessible places and are left unattended for periods of time such as several weeks, months or even years. A number of conventional piston-type electrical generators which have to be started up for a short time every two weeks or so to make sure that oil is distributed throughout bearings and on the pistons thereby to prevent rusting and enable instantaneous starts even in the coldest of weather.

Electrical generators driven by gas turbines operate at very high speeds, say on the order of 20,000–30,000 r.p.m. Customarily such high-speed turbines are lubricated by an oil pumping system or by an oil mist pumping systems. Such lubrication systems are relatively expensive and have the further shortcoming that the oil tends to drain out of the bearings or concentrate in one place when the generator is inactive for long periods of time. Thus, large bearing contact areas are not lubricated and are unprotected against the onslaught of rust and corrosion. Hence, when the generator is to be put into use, starting may be difficult or the bearings may be damaged due to the lack of lubrication.

While it is known that certain high-speed machines, such as electrically powered grinding machines, operate at speeds up to about 40,000 r.p.m. on 15 millimeter ball-bearings and have been able to use conventional grease as the lubricating medium, the operating temperatures of such machines has been relatively low, e.g., in the neighborhood of 300° F. Silicone greases are used in certain application up to about 400° F. but they themselves tend to generate more heat of friction then conventional greases. There has been no known use of grease as the lubricant in any high speed machine wherein heat on the order of 1300° F. is generated.

It is therefore among the objects of the present invention to provide a system for operating a high speed, high heat generating rotating device such as a turbine which employs grease as the lubricant in a way that prevents heat decomposition of the grease yet provides a uniform coating of the grease on the bearing surfaces for protection and easy restarting of the device.

BRIEF STATEMENT OF THE INVENTION

The invention comprises a system for operating a high speed, high temperature rotating device such as a gas turbine generator. Grease is applied to lubricate the bearings associated with the rotor. After the turbine has been running and a high temperature is attained in the turbine section, combustion is stopped. The generator is then energized to act as a motor to turn the rotor at a lower speed to maintain the cooling action of the turbine compressor until such time as the liquefied grease can congeal to form a lubricant coating on all interior surfaces of the bearings.

BRIEF DESCRIPTION OF THE DRAWING

The sole figure is a partly sectional, side elevation view of the system including certain components shown in block and schematic form.

DETAILED DESCRIPTION OF THE DRAWINGS

There is shown in the drawing a turbine indicated generally at the numeral 2 which contains a rotor having a rotor shaft 3 that joins a plurality of turbine blades mounted on a turbine wheel 4 and a plurality of compressor blades mounted on a compressor wheel 5 at the left end to a generator rotor 7a disposed within a DC motor generator 7 at the right end thereof. The wheels 4 and 5 are belted together by a plurality of bolts 6. The turbine 2 also includes a flared ambient air inlet 8 into which air is sucked by the action of the blades of wheel 5. This air travels outward past the diffusers 13 into a plenum 25 which surrounds a generally toroidal combustion chamber 9. The air enters the chamber 9 via apertures 10 formed in the walls thereof. Fuel such as kerosene from a fuel sprayer 11 is sprayed in atomized form through the nozzle 11a that is connected to the fuel line 11b. The fuel is ignited, for example, by a spark generated by a conventional capacitor discharge spark generator indicated schematically at the numeral 29. The ignited gas expands and passes inwardly through a ring of air-foil-shaped nozzles disposed just outside the tips of the blades of turbine wheel 4. These nozzles channel the hot gases against the tips of the blades of the turbine wheel causing it and the rotor shaft or spindle 3 to spin at high speeds. The gas passes the blades and is expelled to the left and out of the turbine via the exhaust port 14.

The shaft or spindle 3 is supported within its two ball bearings 15 and 16. The bearings 15 and 16 are disposed abutting the ends of outer spacing sleeve 18 which includes a number of labyrinth seals 19 and inner spacing sleeve 17. In accordance with the present invention grease indicated generally at the numeral 20 is deposited in the spaces 21, 22, 23, and 24, the last one being a space defined by one side of ball bearing 16 and an end plate 26 which is screwed into the casing 28 of the turbine. Grease is also deposited on the ball bearings themselves and their associated races. Grease need not be put in the space between sleeves 17 and 18 which lies between spaces 22 and 23. There is also a labyrinth seal 27 formed in the central opening of the end plate 26 and a coupling nut 30 is screwed on to the threaded end 3a of the rotor shaft spindle 3 while the shaft extension 3b is screwed into the nut on the other end.

The generator 7 includes a generator rotor 7a that may include a plurality of windings, for example, which rotate in a surrounding field coil (not shown). Connected to the field coil (and to the rotor windings) are two terminals 32 which in turn are connected to the movable arms 33a of a double pole, double throw switch indicated generally at the numeral 33. When the turbine is operating and driving the generator 7, the switch arm 33a is moved (manually or by the relay 36) to contacts 34 that are connected to leads from any desired load 37.

When the turbine generator is to be started up, the switch arms 33a are moved to touch contacts 35 whereupon the generator 7 is energized by a voltage source and acts like a motor to turn the shaft 3 and the associated turbine and compressor wheels 4 and 5 whereupon compressed air is forced into the combustion chamber 9. The fuel spray 11 is also actuated and the ignition device 29 is turned on so that combustion begins in the chamber. The expanding gases then take over the work of turning the turbine wheel whereupon the output of generator 7 is switched to the load 37 by movement of the switch arms 33a to contacts 34.

As combustion proceeds, a large amount of heat, say on the order of 1300° F. is generated in the turbine portion to the left of the compressor wheel 5. The flow of relatively cool ambient air into the inlet 8 past the rotating shaft section tends to keep the casing 28 and other parts to the right of the turbine wheel 4 relativley cool. The temperature in this section, however, is hot enough to render the grease 20 considerably less viscous than it was at the time of starting. In fact the grease may become substantially liquid in form at certain temperatures which nevertheless are well below 1300° F. However, so long as the shaft 3 keeps rotating, the liquefied grease will tend to keep the ball and the race of each of the bearings 15 and 16 lubricated.

If the turbine were to be shut off suddenly, once the turbine has been running for some time and the maximum heat in the turbine has been attained, the high latent heat in the turbine section would be transmitted through the metallic parts into the spindle section. This very high heat would be harmful to the bearings and would act to decompose the grease with resultant diminution of its lubricating qualities. Furthermore, the liquefied grease would tend to run out of the bearing contact surfaces and collect at the lowest point, e.g., at the bottom of annular spaces 22 and 23 if the turbine were mounted horizontally. Consequently the next time the turbine was started up it would be on substantially dry bearings.

In accordance with the present invention, when it is desired to turn off the turbine, the switch 33 is actuated (by relay 36 or manually) so that the arms 33a touch contacts 35. Thus, as was the case in starting the generator, the voltage source 38 will energize the generator 7 to cause it to act like a motor which turns the shaft 3. If the turbine had been running at 30,000 r.p.m., for example, the voltage applied to the generator 7 would be sufficient to rotate it at, say 8,000 r.p.m. In maintaining the compressor wheel 5 in a rotating condition, the ambient air is still drawn into the turbine portion past the bearing section and therefore the turbine will rapidly cool down from its maximum operating temperature. When the temperature of the turbine portion has been reduced to a point at which the grease is not adversely affected, e.g., two or three minutes after the turbine is shut down, the switch arm 33a is actuated so that the voltage source 38 is disconnected from the generator. As a result, all of the contact portions of the bearings and the grease thereon, have been spared the decomposing effect of the very high latent heat of the turbine while the gradual cooling has enabled a uniform coating of grease to be deposited thereupon. This uniform coating provides protection against rust and corrosion and insures that the bearings will be well lubricated when the turbine is next started up. If the next start up does not occur for a long period of time, the coating will nevertheless remain in place whereas conventional oil would tend to drain out and collect at the lowest point.

While conventional greases can be used, it should be appreciated that more exotic greases such as silicone greases can also be used in this novel system. However, since their temperature resistance is higher than that of conventional greases, the energization of the generator to sustain rotation of the compressor wheel after combustion has ceased can be discontinued as soon as the latent heat in the turbine drops to a temperature equal to or below the maximum rated temperature of the silicone grease.

In the practice of the above invention, fluorosilicone grease made by the Dow Chemical Corporation under the designation FS-1292 with a maximum rated temperature of 400° F. has been successfully used. As an example of a conventional grease that has been found satisfactory r.p.m. aviation grease, Type BRB No. 2 made by the California Standard Oil Company is named. Another grease which has been successfully used is "Nebula EP1" type grease made by the Standard Oil Company of New Jersey.

I claim:
1. A method of operating a gas turbine having a rotary shaft supported by bearings, comprising the steps of:
   (a) applying grease to said bearings,
   (b) running said turbine whereupon high combustion heat is generated therein and absorbed by said shaft,
   (c) turning off said turbine, thus terminating the generation of said high combustion heat, and
   (d) maintaining rotation of said rotary shaft thereafter for a time sufficient for said shaft to dissipate said absorbed heat thus cooling said shaft to a temperature which does not decompose said grease and allows it to form a congealed coating on the surface of said bearings.

2. A method of operating a gas turbine which includes a rotary shaft to which a turbine wheel and compressor wheel are connected at one end and to which an electrical generator is connected at the other end, said shaft being mounted on bearings, comprising the steps of:
   (a) applying grease to said bearings,
   (b) beginning combustion in said turbine whereupon high heat is generated therein,
   (c) terminating combustion in said turbine, and
   (d) maintaining rotation of said rotary shaft thereafter at a lower speed than said shaft rotated during combustion and for a time sufficient to keep the temperature of said shaft from rising due to the conduction of combustion heat from said turbine thereto, said rotation also being maintained until said grease has cooled sufficiently to form a congealed coating on the surfaces of said bearing.

3. A method according to claim 2 wherein said (d) step is accomplished by electrically energizing said generator to cause it to be an effective motor which turns said shaft after combustion in said turbine has been terminated.

4. A method according to claim 2 wherein said (d) step includes the passage of ambient air through said turbine for cooling it and said bearings.

5. The method according to claim 2 wherein said shaft is enclosed in a housing and wherein rotation of said compressor wheel during combustion causes the production of a flow of ambient air in contact with said housing to keep the temperature of said bearings below the decomposition temperature of said grease.

References Cited

UNITED STATES PATENTS

| 2,617,253 | 11/1952 | Fusner et al. | 60—39.14X |
| 2,652,685 | 9/1953 | Willgoos | 60—39.14X |
| 2,702,215 | 2/1955 | Diefenderfer | 308—187 |

ALLAN D. HERRMANN, Primary Examiner

U.S. Cl. X.R.

60—39.08; 184—1, 6; 308—187